United States Patent [19]

Nawata et al.

[11] Patent Number: 5,305,522
[45] Date of Patent: Apr. 26, 1994

[54] METHOD OF PRODUCING A COMPOUND ROLL

[75] Inventors: Ryosaku Nawata; Kiyoshi Furushima, both of Kitakyushu; Kenji Date, Fukuoka, all of Japan

[73] Assignee: Hitachi Metals, Ltd., Japan

[21] Appl. No.: 847,508

[22] Filed: Mar. 6, 1992

[30] Foreign Application Priority Data

Jul. 9, 1991 [JP] Japan ............................ 3-167304

[51] Int. Cl.$^5$ ............................................. B31B 31/08
[52] U.S. Cl. ............................ 29/895.32; 29/895.33; 492/58; 492/54
[58] Field of Search ............... 29/129.5, 130, 132, 29/895.3, 895.32, 895.33; 492/58, 54

[56] References Cited

U.S. PATENT DOCUMENTS

| | | | |
|---|---|---|---|
| 3,968,551 | 7/1976 | Miyashita | 29/132 |
| 4,433,032 | 2/1984 | Nakamura et al. | 29/132 X |
| 4,548,653 | 10/1985 | Bocquet et al. | 29/132 X |
| 4,721,153 | 1/1988 | Sano et al. | 29/895.32 X |
| 4,726,417 | 2/1988 | Sano | 29/132 X |
| 4,771,524 | 9/1988 | Barbezat et al. | 29/132 |
| 4,861,549 | 8/1989 | Khare | 29/132 X |
| 4,958,422 | 9/1990 | Oshima et al. | 29/129.5 |
| 5,053,284 | 10/1991 | Noda et al. | 29/132 X |

FOREIGN PATENT DOCUMENTS

| | | |
|---|---|---|
| 50-33021 | 10/1975 | Japan. |
| 56-41050 | 4/1981 | Japan. |
| 57-91861 | 6/1982 | Japan. |
| 1-254363 | 10/1989 | Japan. |
| 2-181191 | 7/1990 | Japan. |

OTHER PUBLICATIONS

Patent Abstracts of Japan, p. 97 M 641 Kokai No. 62-127 108.
Patent Abstracts of Japan, p. 161 C 287.

*Primary Examiner*—Timothy V. Eley
*Attorney, Agent, or Firm*—Finnegan, Henderson, Farabow, Garrett & Dunner

[57] ABSTRACT

The compound roll comprising a shell portion made of a hard cast iron having excellent wear resistance and resistance to surface roughening and a core portion made of a tough cast iron or cast steel, the cast iron of the shell portion having a composition consisting essentially, by weight ratio, of 2.5-3.5% of C, 0.5-1.5% of Si, 0.5-1.5% of Mn, 0.1% or less of P, 0.05% or less of S, 3.0-5.0% of Ni, 1.0-2.5% of Cr, 0.1-1.5% of Mo and balance Fe and inevitable impurities, an average diameter of primary precipitated particles constituting a matrix of the metal structure of the shell portion being 80 μm or less in a range from a surface to a depth of 50 mm when determined by an image analysis method on the primary precipitated particles having diameters exceeding 30 μm, and the primary precipitated particles satisfying the formula: $m_2 \leq 1.2\ m_1$, wherein $m_1$ is an average diameter of the primary precipitated particles at the surface of the shell portion, and $m_2$ is an average diameter of the primary precipitated particles at the depth of 50 mm, is produced by supplying a melt for the shell portion at a temperature T satisfying the formula: $Tc - 20°\ C. \leq T \leq Tc + 70°\ C.$, wherein Tc is a primary crystal-forming temperature of the melt for the shell portion, to a hollow cylindrical mold rotatable around its longitudinal axis, at such a speed that an average shell portion-forming speed in the mold is 2–40 mm/min.

3 Claims, 3 Drawing Sheets

400 μm $\overline{400\mu m}$ $\overline{400\mu m}$

400μm

400μm

METHOD OF PRODUCING A COMPOUND ROLL

BACKGROUND OF THE INVENTION

The present invention relates to a compound roll comprising a shell portion having excellent wear resistance and resistance to surface roughening and a tough core portion, and a method of producing such a compound roll by a centrifugal casting method, particularly to a compound roll having a shell portion having a fine and uniform metal structure and a method of producing such a compound roll.

In a roll used for hot rolling or cold rolling of steel materials, it is required that a shell portion, which is brought into direct contact with materials to be rolled, has a uniform cast structure and excellent wear resistance, resistance to surface roughening and crack resistance. To meet this requirement, it is effective to form the shell portion by a centrifugal casting method, and the production of compound rolls having shell portions and core portions is widely conducted. In the centrifugal casting method, a melt for a shell portion is usually introduced into a hollow cylindrical mold rotatable around its longitudinal axis at a high speed, and solidified in the mold.

In this case, since the melt is rapidly cooled by contact with an inner surface of the mold usually made of steel, the shell portion of the compound roll has a fine metal structure. However, as a distance between the inner surface of the mold and the melt to be solidified becomes larger, the cooling speed of the melt for the shell portion decreases, and the temperature gradient of the melt becomes smaller. As a result, the metal structure of the shell portion becomes coarser, so that various properties required for the shell portion such as a wear resistance, etc. are deteriorated. To solve this problem, it is considered to be effective that the cooling speed of the melt for the shell portion is increased, and it is necessary to make the cooling speed of the melt as even as possible in any portion along the radial direction of the shell portion.

To increase the cooling speed of the melt for the shell portion, proposals were made to cool the mold by water, and to spray the melt onto an inner surface of the mold (Japanese Patent Laid-Open No. 1-254363). Also, to avoid undesirable segregation and other defects generated in the shell portion and to improve the uniformity of the shell portion, it was proposed to move the point of pouring the melt into the mold in the centrifugal casting method (Japanese Patent Publication No. 50-33021). Further, research has been conducted on the materials for the shell portion. At present, the shell portion produced by the centrifugal casting method is mainly made of a high-alloy cast iron, a high-chromium cast iron, a high-chromium cast steel, etc.

Among them, in the case of a roll mainly used on a rear side in a tandem mill, which has a shell portion made of a high-alloy cast iron, the non-uniformity of the cast metal structure of the shell portion due to the existence of coarse precipitated grains and segregation leads to a poorer wear resistance, resulting in the increase of roll consumption per a unit weight of a material to be rolled and poorer quality of the rolled material.

Since high quality is increasingly required for rolled steel sheets recently, high requirements are imposed on the roll. Therefore, the shell portion of the compound roll is required to have an increasingly finer metal structure with higher uniformity.

The high-alloy cast iron is a material in which graphite particles are inherently likely to be precipitated. Accordingly, in the case of forming the shell portion from the high-alloy cast iron, a surface portion of the shell portion not only has a fine metal structure but also contains fine graphite particles and a fine carbide phase by the rapid cooling action of the mold. However, since the rapid cooling action of the mold decreases inside the shell portion, the metal structure becomes coarser and the amount of graphite particles precipitated increases while the amount of the carbide phase decreases. As a result, in the deep area of the shell portion, which is to be exposed by several times of machining, it shows poor resistance to wear and surface roughening.

In the case of forming the shell portion by a centrifugal casting method, there is also a problem that the shell portion inevitably contains cast defects and non-uniformity of the metal structure. Since the cooling speed (temperature gradient) of the shell portion is smaller in the inside than in the surface portion, it is difficult for gas, dissolved elements, impurities, etc. in the melt for the shell portion to escape toward an inside cavity into which the melt is poured. Accordingly, these components are trapped in the process of solidifying the melt, resulting in the segregation, coarse metal structure, gas defects, etc.

OBJECT AND SUMMARY OF THE INVENTION

Accordingly, an object of the present invention is to provide a compound roll having a shell portion having a fine metal structure with excellent uniformity.

Another object of the present invention is to provide a method of producing such a compound roll.

As a result of intense research in view of the above objects, the inventors have found that by controlling the supply temperature of the melt and the shell portion-forming speed, a large cooling speed and so a large temperatrue gradient can be achieved in the solidification interface between the melt and the shell portion, thereby preventing the excess growth of the metal structure in the shell portion, which in turn leads to the shell portion free from cast defects.

Thus, the compound roll according to the present invention comprises a shell portion made of a hard cast iron having excellent wear resistance and resistance to surface roughening and a core portion made of a tough cast iron or cast steel, said cast iron of said shell portion having a composition consisting essentially, by weight ratio, of 2.5–3.5% of C, 0.5–1.5% of Si, 0.5–1.5% of Mn, 0.1% or less of P, 0.05% or less of S, 3.0–5.0% of Ni, 1.0–2.5% of Cr. 0.1–1.5% of Mo and balance Fe and inevitable impurities, an average diameter of primary precipitated particles constituting a matrix of the metal structure of said shell portion being 80 $\mu$m or less in a range from a surface to a depth of 50 mm when determined by an image analysis method on the primary precipitated particles having diameters exceeding 30 $\mu$m, and said primary precipitated particles satisfying the formula: $m_2 \leq 1.2 \, m_1$, wherein $m_1$ is an average diameter of said primary precipitated particles at the surface of said shell portion, and $m_2$ is an average diameter of said primary precipitated particles at the depth of 50 mm.

The method of producing a compound roll according to the present invention comprises supplying a melt for said shell portion at a temperature T satisfying the formula: $Tc-20°C. \leq T \leq Tc+70°C.$, wherein Tc is a primary crystal-forming temperature in said shell portion, to a hollow cylindrical mold rotatable around its longitudinal axis, at such a speed that an average shell portion-forming speed in said mold is 2–40 mm/min.

DETAILED DESCRIPTION OF THE PREFERRED EMBODIMENTS

Figure 1:
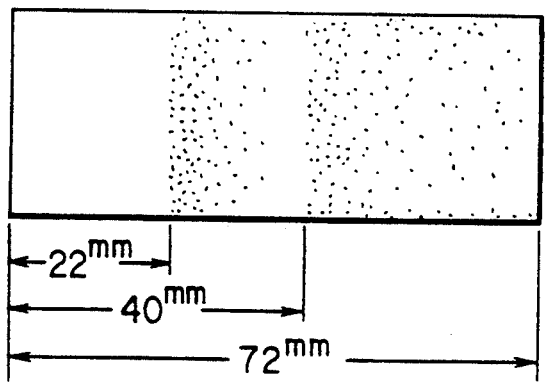
FIG. 1 is a schematic view showing the result of a sulfur print test in Example 1.

[1] Composition of cast iron for shell portion

The cast iron which may be used for the shell portion of the compound roll according to the present invention has the following composition:

(1) C: 2.5–3.5 weight %

As the amount of C increases, cementite and graphite increase. This leads to the deterioration of mechanical properties of the roll while its wear resistance is improved. Accordingly, the amount of C should be within such a range as to improve the hardness and wear resistance of the roll without lowering the mechanical properties thereof. Specifically, if the amount of C is less than 2.5 weight %, the resulting roll would show a poor wear resistance. On the other hand, if the amount of C is more than 3.5 weight %, the resulting roll would be brittle.

(2) Si: 0.5–1.5 weight %

Si has a function of increasing the amount of graphite particles precipitated, thereby decreasing the amount of cementite. To obtain a proper amount of graphite particles, the amount of Si should be at least 0.5 weight %. However, if the amount of Si exceeds 1.5 weight %, the resulting roll would become brittle.

(3) Mn: 0.5–1.5 weight %

Mn forms a compound with S so that the adverse effect of S is eliminated. Also, Mn has a function of forming a white cast iron and of forming hard bainite phase and martensite phase. To achieve the above functions effectively, the amount of Mn should be 0.5–1.5 weight %.

(4) P: 0.1 weight % or less

Since P makes the roll brittle, the amount of P should be as small as possible. However, P is contained as an inevitable impurity in the alloy used for the shell portion. To suppress the adverse effect of P, the amount of P should be 0.1 weight % or less.

(5) S: 0.05 weight % or less

Since S makes the roll brittle and decreases the fluidity of the melt, the amount of S should be as small as possible. However, S is contained as an inevitable impurity in the alloy used for the shell portion. To suppress the adverse effect of S, the amount of S should be 0.05 weight % or less.

(6) Ni: 3.0–5.0 weight %

Ni is effective to form hard bainite phase and martensite phase in the metal structure. However, if it is added excessively, there appears a residual austenite phase in the metal structure of the shell portion, resulting in a poor hardness. To obtain the cast iron shell portion having the metal structure based on a bainite phase and a martensite phase, the amount of Ni should be 3.0–5.0 weight %.

(7) Cr: 1.0–2.5 weight %

Cr has a strong function of forming a white cast iron. It also has a function of forming hard bainite phase and martensite phase. To prevent the graphitization function of Ni effectively while achieving the function of forming hard bainite phase and martensite phase, the amount of Cr should be in a good balance with the amount of Ni. Specifically, the amount of Cr should be 1.0–2.5 weight %.

(8) Mo: 0.1–1.5 weight %

Mo serves to increase an as-cast hardness and a resistance to tempering softening. These effects are appreciated in an amount of 0.1 weight % or more. However, if the amount of Mo exceeds 1.5 weight %, the residual austenite phase increases in the metal structure, resulting in a poor as-cast hardness. Accordingly, the amount of Mo should be 0.1–1.5 weight %.

(9) Additional elements

In addition to the above elements, the cast iron for the shell portion may optionally contain V, Nb, W, etc.

V increases the resistance to tempering softening and of making the cast structure finer. The finer cast structure of the shell portion can lead to the production of well finished rolled sheets. Such effect would not be sufficient if the amount of V is lower than 0.1 weight %. However, if the amount of V exceeds 2.0 weight %, VC carbides are excessively precipitated, so that the as-cast hardness of the matrix of the shell portion is deteriorated. Accordingly, the amount of V is 0.1–2.0 weight %.

Nb serves to form a carbide (NbC) and to make the metal structure finer by decreasing the amount of cementite. Such effect would not be sufficient if the amount of Nb is lower than 0.1 weight %. However, if the amount of Nb exceeds 2.0 weight %, the carbide (NbC) is excessively precipitated. Accordingly, the amount of Nb is 0.1–2.0 weight %.

W has a similar function to that of Mo. When the amount of W reaches 0.1 weight %, the function is effectively exerted. However, if the amount of W exceeds 2.0 weight %, the residual austenite phase increases in the metal structure, and the as-cast hardness is deteriorated. Accordingly, the amount of W is 0.1–2.0 weight %.

[2] Centrifugal Casting Method

The centrifugal casting method according to the present invention is conducted under the conditions of the controlled supply temperature of the melt for the shell portion and the controlled shell portion-forming speed.

(1) $Tc-20°C. \leq T \leq Tc+70°C.$

In the centrifugal casting method, the temperature of the melt for the shell portion measured in a tundish is usually regarded as its casting temperature. However, the actual temperature of the melt in the hollow cylindrical mold is somewhat lower than the temperature of the melt measured in the tundish. To achieve an accurate control of the casting temperature, the temperature of the melt in the hollow cylindrical mold should be determined. Although it is generally difficult to measure the temperature of the melt in the mold, the inventors have found that there is a correlation between the temperature of the melt just discharged from the outlet of the tundish and the temperature of the melt in the mold. This correlation can be determined experimentally depending on the size and shape of the hollow cylindrical mold, pouring speed of the melt and operation conditions, etc. Accordingly, the temperature of the melt just flowing from the outlet of the tundish can be controlled to achieve the most preferred casting temperature.

Defining the temperature of the melt just flowing from the outlet of the tundish (entering into the hollow cylindrical mold) as a supply temperature "T", the supply temperature should meet the requirement: $Tc - 20° C. \leq T \leq Tc + 70° C.$, wherein Tc is a primary crystal-forming temperature in said shell portion, although the primary crystal-forming temperature may vary depending on the composition of the melt.

The above supply temperature is lower than the casting temperature in the conventional centrifugal casting method. Accordingly, the melt starts to be solidified as soon as it is introduced into the hollow cylindrical mold. In this case, austenitic primary crystals may already partially exist in the melt in the tundish or in the discharging nozzle of the tundish through which the melt is introduced into the hollow cylindrical mold.

If the supply temperature T is lower than $Tc - 20° C.$, the melt starts to be solidified in the discharge nozzle of the tundish, failing to the formation of a good shell portion. On the other hand, if the supply temperature T is higher than $Tc + 70° C.$, it takes too much time until the melt is solidified in the hollow cylindrical mold, failing to provide a large cooling speed. This leads to the excess growth of the metal structure of the shell portion resulting in a coarse metal structure (coarse primary crystals).

Particularly, in a case where the solid-liquid coexistence region of the cast iron material is sufficiently wide, it is preferable to utilize the supply temperature T lower than Tc ($Tc - 20° C. \leq T \leq Tc$).

Incidentally, the supply temperature T can be determined by subtracting an experimentally obtained parameter (10°-60° C.) from the temperature of the melt just exiting from the discharge nozzle of the tundish.

(2) Average shell portion-forming speed

The average shell portion-forming speed is defined herein as a value obtained by dividing the total thickness of the shell portion formed by the time consumed. In general, the shell portion-forming speed in a usual centrifugal casting method is set at 50-200 mm/min. in order to make sure that the melt introduced can be uniformly laid on an entire inner surface of the mold. However, such a high shell portion-forming speed leads to a small cooling speed of the melt in the mold, which means that a uniform, fine metal structure cannot be obtained in the shell portion.

In the present invention, the average shell portion-forming speed is set at as small as 2-40 mm/min. to make sure that the melt is supplied onto the surface of the shell portion being formed in the mold at substantially the same speed as the advancing speed of the solidification interface. By controlling the average shell portion-forming speed at this level, a thin melt pool can always be kept inside the shell portion being formed in the mold, and the solidification interface can advance radially inward without disturbance and non-uniformity.

Since the thin melt pool has a small heat capacity, a large cooling speed of the melt pool can be achieved by heat conduction and heat dissipation through the solidified shell portion and the mold. Also, since the melt pool is cooled in the mold from near a primary crystal-forming temperature to a solid-liquid solidification temperature, a large temperature gradient can be obtained. Such large cooling speed and temperature gradient can be achieved inside the thin melt pool by causing the solidification interface to advance to perpendicular to the axis of the hollow cylindrical mold while keeping uniformity. This contributes to the formation of a uniform and fine metal structure without cast defects. Such effects would not be obtained if the average shell portion forming speed exceeds 40 mm/min., resulting in a coarse metal structure. On the other hand, if the average shell portion-forming speed is lower than 2 mm/min., the supply of the melt is so insufficient that the supply of the melt pool cannot keep up with the advance of the solidification interface, failing to provide a good shell portion.

Incidentally, in the initial stage of supplying the melt for the shell portion into the mold, the supply speed of the melt may be as high as 50-200 mm/min. because the melt in contact with the inner surface of the mold is rapidly cooled. This initial stage may be conducted generally up to about 40%, preferably up to about 35% of the total thickness of the shell portion. Thereafter, the shell portion-forming speed should be lowered, so that the average shell portion-forming speed becomes 2-40 mm/min.

With respect to the core portion, it should be noted that its materials and production conditions are not restrictive, and that any cast iron and cast steel can be used under known casting conditions as long as high mechanical strength such as bending strength, toughness, etc. can be achieved.

[3] Metal Structure of Shell Portion

The shell portion produced by the above centrifugal casting method has a metal structure in which fine primary precipitated particles are uniformly distributed, and fine graphite particles are uniformly dispersed. The term "primary precipitated particles" used herein means particles or phases primarily precipitated in the solidification of the melt of the shell portion, which mainly consist of austenite. The primary precipitated particles are sometimes called "primary crystals."

In the first aspect of the present invention, the fine primary precipitated particles have an average diameter of 80 μm or less from a surface to a depth of 50 mm in the shell portion, when only fine primary precipitated particles having diameters exceeding 30 μm are counted in an image analysis method.

Since the primary precipitated particles are in various shapes in a photomicrograph, their diameters cannot be determined without converting the primary precipitated particles to true circles. Accordingly, they are first converted to true circles having the same areas as those of the primary precipitated particles by an image analysis method, and the diameters of the true circles obtained from the primary precipitated particles are averaged. In this case, only the true circles having diameters exceeding 30 μm are counted, because calculation would be extremely difficult if those having diameters lower than 30 μm are included in the calculation of the average diameter.

If the average diameter of the primary precipitated particles calculated by the above method is larger than 80 μm, the metal structure of the shell portion is too rough, failing to produce high-quality rolled steel sheets.

In the second aspect of the present invention, the average diameter of the primary precipitated particles satisfies the formula: $m_2 \leq 1.2\, m_1$, wherein $m_1$ is the average diameter of the primary precipitated particles at the surface of the shell portion, and $m_2$ is the average diameter of the primary precipitated particles at the depth of 50 mm. If this relation is not met, the metal structure of the shell portion would be too non-uniform in a radial direction, meaning that the wear resistance and the resistance to surface roughening decrease rapidly by cutting the roll surface to remove a surface roughness after a certain period of service. This leads to a high roll cost per a unit amount of rolled steel sheets.

The average diameter of the graphite particles is determined in the same manner as the primary precipitated particles. It is preferable that the graphite particles in the metal structure of the shell portion have an average diameter of 65 μm or less in a range from a surface to a depth of 50 mm when determined by an image analysis method on the graphite particles having diameters exceeding 28 μm. If the average diameter of the graphite particles is larger than 65 μm, good wear resistance and resistance to surface roughening, which are required to the shell portion, cannot be achieved, failing to produce high-quality rolled sheets.

The present invention will be explained in detail by way of the following Examples.

EXAMPLE 1, COMPARATIVE EXAMPLE 1

Using a hollow cylindrical mold having an inner diameter of 365 mm and a roll body length of 1530 mm, 725 kg of a melt having a composition shown in Table 1 was centrifugally cast to provide a sleeve having a thickness of 72 mm.

the mold. By conducting a differential thermal analysis, the primary crystal-forming temperature Tc was found to be 1225° C. Accordingly, the supply temperature of the melt was Tc+25° C. in Example 1 and Tc+80° C. in Comparative Example 1.

Incidentally, to prevent surface chill, surface defects, surface roughness due to the quenching of the melt by contact with the mold, the initial supply speed of the melt (corresponding to about 20% of the total amount the melt supplied) was made high, and the supply speed of the remaining melt was made low. Namely, in the shell portion having a total thickness of 72 mm, the initially cast (outer) portion of the shell portion having a thickness of 14 mm was formed at a supply speed of 100 mm/min., and the later cast (inner) portion of the shell portion having a thickness of 58 mm was formed at a supply speed of 10 mm/min. Thus, the casting of the shell portion was completed for 5 minutes 50 seconds. The average shell portion-forming speed was about 12 mm/min.

In the method of Example 1, to measure the advance speed of the solidification interface of the melt, 200 g of iron sulfide was added to the melt in the inlet opening of the mold when the thickness of the melt supplied became 35 mm and 56 mm, respectively.

The resulting shell portion was machined to obtain test pieces for measuring the metal structure of the shell portion.

FIG. 1 schematically shows the result of the sulfur print test in Example 1. The measurement results are shown in Table 2.

TABLE 2

| At Time of Adding Iron Sulfide | | Position of Solidification Interface Measured by Sulfur Print | Thickness of Melt Pool | Average Advance Speed of Solidification Interface |
|---|---|---|---|---|
| Time (t) | T* of Melt (A) | (B) | (A–B) | (B/t) |
| 2 min. 15 sec. | 35 mm | 22 mm | 13 mm | 9.8 mm/min. |
| 4 min. 20 sec. | 56 mm | 40 mm | 16 mm | 9.2 mm/min. |

Note
*Thickness.

As shown in FIG. 1, since the position of the solidification interface of the melt was 22 mm from the inner surface of the mold (outer surface of the shell portion) when the thickness of the melt was 35 mm, the thickness of the unsolidified melt pool was 13 mm, and the average shell portion-forming speed (average advance speed of the solidification interface) was 9.8 mm/min. Also, since the position of the solidification interface of the melt was 40 mm from the inner surface of the mold when the thickness of the melt was 56 mm, the thickness of the unsolidified melt pool was 16 mm, and the average advance speed of the solidification interface was 9.2 mm/min.

TABLE 1

| Sample No.* | Chemical Composition (weight %) | | | | | | | | $T_s^{(1)}$ (°C.) | $V_{av}^{(2)}$ (mm/min.) |
| | C | Si | Mn | P | S | Ni | Cr | Mo | | |
|---|---|---|---|---|---|---|---|---|---|---|
| 1 | 3.41 | 0.86 | 0.81 | 0.012 | 0.006 | 4.35 | 1.80 | 0.36 | 1250 | 12 |
| 2 | 3.40 | 0.85 | 0.83 | 0.018 | 0.007 | 4.45 | 1.79 | 0.35 | 1305 | 108 |

Note:
*Sample No. 1***Example 1
Sample No. 2*** Comparative Example 1
$^{(1)}$Supply temperature of the melt.
$^{(2)}$Average shell portion-forming speed.

In both cases, the inner surface of the mold was coated with a refractory material in a thickness of 2.5 mm, and the rotation speed of the mold was set such that a centrifugal gravity number was 140 G on the surface of the melt being formed into the shell portion in It was then confirmed by the observation of the metal structure of the shell portion that the shell portion had a fine and uniform matrix structure from a surface area to a depth of 50 mm.

EXAMPLES 2 and 3. Comparative Example 2

Using a hollow cylindrical mold having an inner diameter of 783 mm and a roll body length of 2250 mm, a melt having a composition shown in Table 3 was centrifugally cast to provide a sleeve having a thickness of 100 mm.

TABLE 3

| Sample No.* | Chemical Composition (weight %) | | | | | | | | $T_s^{(1)}$ (°C.) | $V_{av}^{(2)}$ (mm/min) |
|---|---|---|---|---|---|---|---|---|---|---|
| | C | Si | Mn | P | S | Ni | Cr | Mo | | |
| 3 | 3.40 | 0.87 | 0.80 | 0.019 | 0.011 | 4.41 | 1.83 | 0.35 | 1235 | 16 |
| 4 | 3.39 | 0.85 | 0.78 | 0.016 | 0.013 | 4.45 | 1.75 | 0.37 | 1265 | 8 |
| 5 | 3.41 | 0.88 | 0.80 | 0.017 | 0.007 | 4.40 | 1.70 | 0.36 | 1300 | 120 |

Note:
*Sample Nos. 3 and 4***Examples 2 and 3
Sample No. 5*** Comparative Example 2
(1)Supply temperature of the melt.
(2)Average shell portion-forming speed.

In all cases, the inner surface of the mold was coated with a refractory material in a thickness of 2.0 mm, and the rotation speed of the mold was set such that a centrifugal gravity number was 120 G on the surface of the melt being formed into the shell portion in the mold. The primary crystal-forming temperature Tc was 1225° C. Accordingly, the supply temperature of the melt was Tc + 10° C. in Sample No. 3 (Example 2), Tc + 40° C. in Sample No. 4 (Example 3), and Tc + 75° C. in Sample No. 5 (Comparative Example 2).

Incidentally, the initial supply speed of the melt (corresponding to about 30% of the total amount the melt supplied) was made high, and the supply speed of the remaining melt was made low. Namely, in the shell portion having a total thickness of 100 mm, the initially cast (outer) portion of the shell portion having a thickness of 30 mm was formed at a supply speed of 120 mm/min., and the later cast (inner) portion of the shell portion having a thickness of 70 mm was formed at a supply speed of 12 mm/min. in Example 2 and 6 mm/min. in Example 3. Thus, the casting of the shell portion was completed for 6 minutes 5 seconds in Example 2 and for 12 minutes 20 seconds in Example 3. The average shell portion-forming speed was about 16 mm/min. in Example 2 and about 8 mm/min. in Example 3.

In Examples 2 and 3, to measure the advance speed of the solidification interface of the melt, 1500 g of iron sulfide was added to the melt in the inlet opening of the mold when the thickness of the melt supplied became 70 mm.

Each of the resulting shell portions was machined to obtain test pieces for measuring the metal structure of each shell portion. Also, after eliminating the surface machining allowance of the as-cast products by machining, the entire roll body (length: 2250 mm) of each compound roll was machined 11 times from a surface to a depth of 50 mm at an interval of 5 mm in a radial direction to investigate the cast defects and segregation by an ultrasonic testing method, by observation by the naked eye, and by macro-etching.

In Example 2, the solidification interface of the melt reached a position of 42 mm from the surface of the resulting shell portion, when the thickness of the melt became 70 mm, namely, when it took 3 min. 30 sec. from the initiation of the supply of the melt. At this time, the thickness of the unsolidified melt pool was 28 mm, and the average advance speed of the solidification interface was 12 mm/min. (0.2 mm/sec.).

Also, in Example 3, the solidification interface of the melt reached a position of 46 mm from the surface of the resulting shell portion, when the thickness of the melt became 70 mm, namely, when it took 5 min. 30 sec. from the initiation of the supply of the melt. At this time, the thickness of the unsolidified melt pool was 24 mm, and the average advance speed of the solidification interface was 8.4 mm/min. (0.14 mm/sec.).

Figure 2:
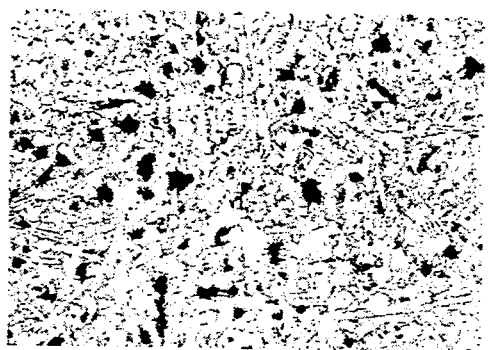
FIG. 2 is a photomicrograph (magnification: 50) showing the metal structure in a surface portion of the shell portion in Example 2.
Figure 3:
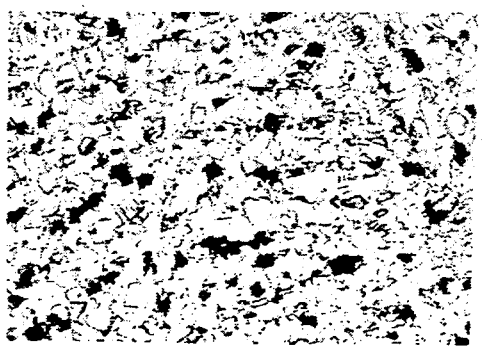
FIG. 3 is a photomicrograph (magnification: 50) showing the metal structure of the shell portion at a depth of 50 mm from the surface in Example 2.
Figure 4:
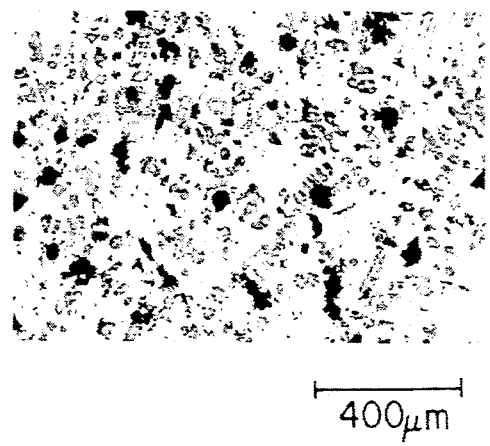
FIG. 4 is a photomicrograph (magnification: 50) showing the metal structure in a surface portion of the shell portion in Comparative Example 2.
Figure 5:
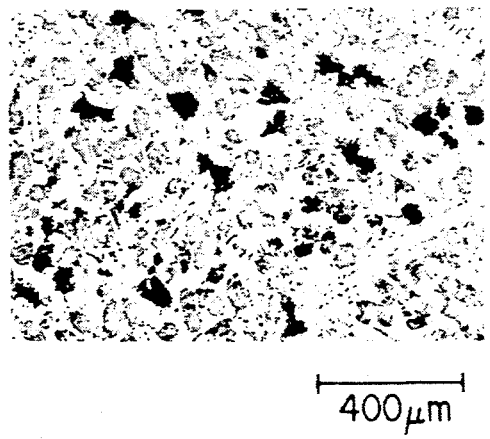
FIG. 5 is a photomicrograph (magnification: 50) showing the metal structure of the shell portion at a depth of 50 mm from the surface in Comparative Example 2.

FIGS. 2 and 3 are photomicrographs showing the metal structure of the shell portion in a surface portion and a deep portion (50 mm from the surface) in Example 2, and FIGS. 4 and 5 are photomicrographs showing the metal structure of the shell portion in a surface portion and a deep portion (50 mm from the surface) in Comparative Example 2. In these photomicrographs, areas in a gray color are a matrix structure (primary crystal structure), and those in a black color are graphite particles.

The metal structure of the shell portion in a surface portion and a deep portion (50 mm from the surface) in each compound roll was quantitatively measured by an image analysis method. In the measurement, primary precipitated particles having various shapes were first converted to true circles having the same areas in the photomicrograph as those of the primary precipitated particles, and only the true circles having diameters exceeding 30 μm were counted for obtaining the average diameter of the primary precipitated particles. For the measurement of the matrix structure, the surface of the test piece to be measured was subjected to heavy etching so that the matrix particles (primary crystals) were turned to black, and the same measurement was repeated on 20 fields in the photomicrograph. An average value of the measured results was used as an average diameter of the matrix particles.

With respect to the graphite particles, the same measurement procedure was conducted on particles having diameters larger than 28 μm, and an average value was obtained from 10 fields in the photomicrograph of test pieces whose surfaces were polished by a buff.

As a result, in Comparative Example 2, the matrix particles had an average diameter of 62 μm in a surface portion and 85 μm in a portion as deep as 50 mm from the surface. Also, the granular or worm-like graphite particles had an average diameter of 55 μm in a surface portion and 70 μm in a portion as deep as 50 mm from the surface. In the 50-mm-deep portion, the amount of the graphite particles was excessive.

On the other hand, in Examples 2 and 3, the matrix particles had an average diameter of 60 μm and 58 μm, respectively, in a surface portion, and 70 μm and 68 μm, respectively, in a portion as deep as 50 mm from the surface. Also, the granular or worm-like graphite particles had an average diameter of 42 μm and 39 μm, respectively, in a surface portion, and 51 μm and 47 μm, respectively, in a portion as deep as 50 mm from the surface. This means that in the shell portion of the compound roll according to the present invention, the shell portion is formed by a fine and uniform metal structure from a surface to a deep portion.

As a result of ultrasonic testing, no cast defects were observed in Examples 2 and 3. After eliminating the surface machining allowance of the as-cast products, the shell portion was machined repeatedly by 5 mm in a radial direction to observe the metal structure of the inside portion of the shell portion. Hard spot segregation (12 mm in diameter) was observed by the naked eye at one point at the depth of 35 mm and at two points at the depth of 43 mm in the shell portion produced in Comparative Example 2.

As a result of observation by the naked eye and macroetching, it was confirmed that there was a non-uniformity of the metal structure (segregation) in an entire area at a depth exceeding 15 mm in the shell portion of Comparative Example 2. On the other hand, in Examples 2 and 3, defects, cast defects and segregation were not observed in the shell portion by the naked eye and by macroetching.

In the above Examples, the high-alloy cast iron material was used for the shell portion, but it should be noted that any other cast iron may be used as long as fine and uniform metal structures can be obtained by a centrifugal casting method.

As described above, the compound roll of the present invention comprises a shell portion having a fine and uniform metal structure free from cast defects, segregation, etc. Therefore, it can be used for producing high-quality rolled steel sheets by hot rolling or cold rolling, and the amounts of the rolled steel sheets per a unit consumption of the shell portion of the compound roll can be increased.

What is claimed is:

1. A method of producing a compound roll comprising a shell portion made of a hard cast iron having excellent wear resistance and resistance to surface roughening and a core portion made of a tough cast iron or cast steel, which method comprises forming said shell portion by centrifugally casting an iron having a composition consisting essentially, by weight ratio, of 2.5–3.5% of C, 0.5–1.5% of Si, 0.5–1.5% of Mn, 0.1% or less of P, 0.05% or less of S, 3.0–5.0% of Ni, 1.0–2.5% of Cr, 0.1–1.5% of Mo and balance Fe and inevitable impurities, said shell portion having a surface portion extending radially inward from an outer surface of said shell portion, and wherein said cast iron in that part of said surface portion ranging from said outer surface to a depth of 50 mm has a metal structure comprising a matrix of primary precipitated particles having an average diameter of 80 μm or less when determined by an image analysis method on the primary precipitated particles having diameters exceeding 30 μm, and said primary precipitated particles satisfy the formula: $m_2 \leq 1.2 m_1$, wherein $m_1$ is an average diameter of said primary precipitated particles at the surface of said shell portion, and $m_2$ is an average diameter of said primary precipitated particles at the depth of 50 mm, which method further comprises supplying a melt for said shell portion at a temperature T satisfying the formula: $Tc - 20° C. \leq T \leq Tc + 70° C.$, wherein Tc is a primary crystal-forming temperature of the melt for said shell portion, to a hollow cylindrical mold rotatable around its longitudinal axis.

2. The method according to claim 1, wherein said melt is supplied for said shell portion at an average shell portion-forming speed of 2–40 mm/min.

3. The method according to claim 1, wherein said melt for said shell portion is supplied to said hollow cylindrical mold in two stages comprising a first stage wherein said melt is supplied to said mold at such a speed that said average shell portion-forming speed is 50–200 mm/min until up to about 40% of the total thickness of said shell portion is formed, and a second stage wherein said melt is supplied to said mold at such a speed that said average shell portion-forming speed is 2–40 mm/min until the formation of the remaining portion of said shell portion is completed.

* * * * *